April 20, 1937.  H. CHIREIX  2,078,058
RADIOGONIOMETER
Filed Nov. 9, 1935
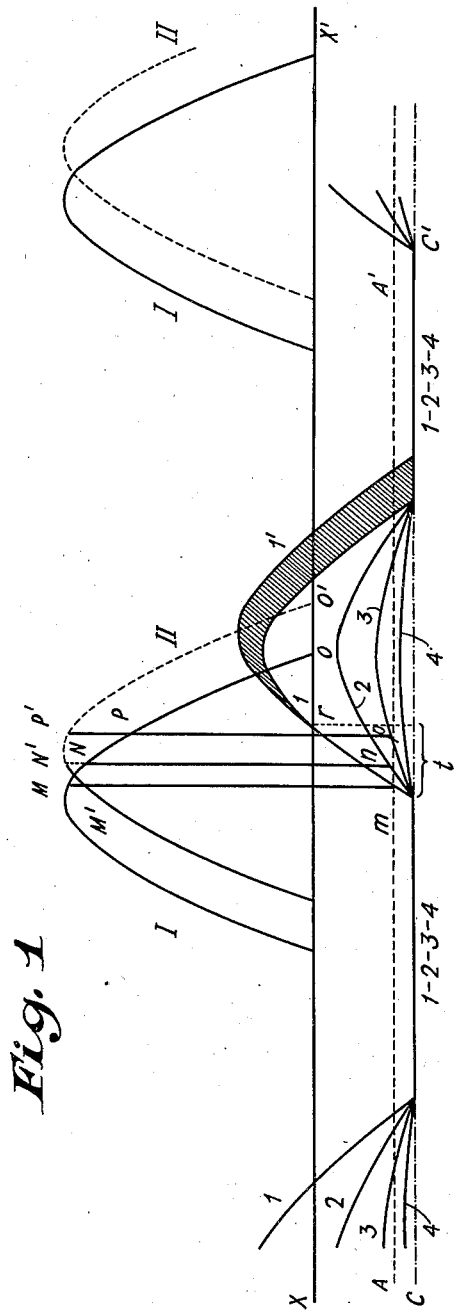
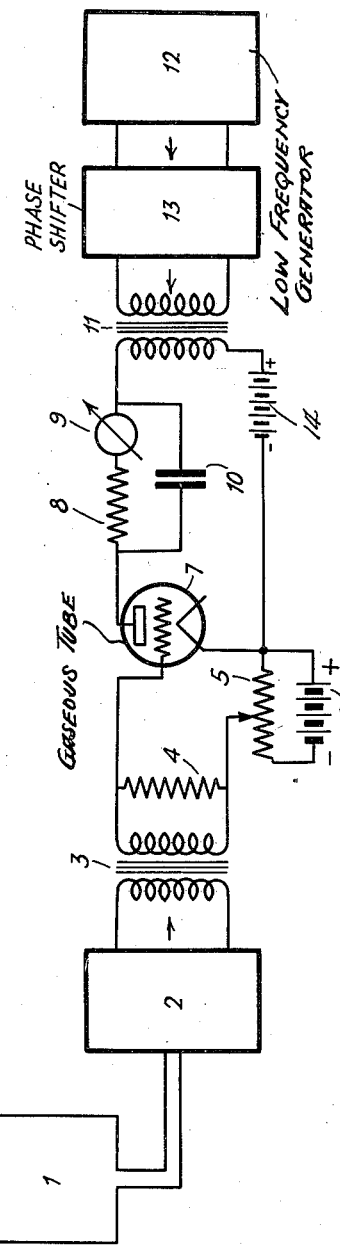
INVENTOR.
HENRI CHIREIX
BY
ATTORNEY.

Patented Apr. 20, 1937

2,078,058

UNITED STATES PATENT OFFICE 2,078,058

RADIOGONIOMETER

Henri Chireix, Paris, France, assignor to Compagnie Generale de Telegraphie sans Fil, a corporation of France Application November 9, 1935, Serial No. 48,985
In France November 14, 1934

4 Claims. (Cl. 250—11)

This invention relates to radiogoniometers and has particularly to do with the problem of eliminating the effects of so-called "nocturnal errors."

It is well known that the taking of bearings by the aid of radiogoniometer outfits is vitiated by what has been called nocturnal effects, chiefly during the dawn and dusk periods, because of the fact that one or more reflected rays become superposed on the direct radiation. The reflected rays are generally ascribed to the so-called Kennelly-Heaviside layer in the upper atmosphere.

It is an object of my invention to provide a radiogoniometer system which shall be relatively free from the effects of reflected radiations.

The indirect radiations because of the longer path they have to travel reach the receiver in the form of echoes, that is to say, with a certain time lag being of an order of, say, 1/2000 of a second. Hence, correct radiogoniometer data would be obtainable with a standard outfit for direction finding work if in some way it were feasible to eliminate these echoes from the measuring results.

The method here disclosed consists in sending out a series of regularly spaced impulses, with a cadence or rhythm of several hundred per second, for instance, and under such conditions that the impulses will preferably endure for at least one-half of the total time. It is preferable, too, that the length of these impulses should be great compared with the echo time. I then provide a receiver which is adapted to respond only to the beginning of each impulse.

The receiver preferably comprises a so-called "Thyratron" or gas-filled tube, whose plate is fed from an alternating potential of a predetermined frequency and one that is quasi-synchronous with that of the transmitted impulses. This alternating plate potential is superposed on a direct current plate potential of suitable value. The tube is thus enabled to flash over only during that part of the signaling impulse which synchronizes with the positive wave crest of the alternating plate potential. The goniometric measurements are derived from apparatus which utilizes the plate current of this "Thyratron" tube. Hence it is only at the start of the signaling impulse that the signal is submitted to goniometric measurement.

My invention will be more readily understood from the following detailed description taken in connection with the accompanying drawing in which Figure 1 shows diagrammatically the relationship between certain waves; and Fig. 2 shows a typical circuit diagram of receiving apparatus arranged according to my invention.

Referring to Fig. 1, suppose that the envelope of the signals sent out is a sequence of semi-sinusoids spaced an alternation apart, it being understood that this form of signals has been chosen merely by way of example inasmuch as it is easy to produce the same by suitable modulation of the transmitter or beacon.

The diagram Fig. 1 shows the graphs of the grid and plate voltages applied to the gaseous tube and corresponding to the regulation data.

Referring to these graphs, XX, designates the abscissa of time, the straight dot-dash line CC' the negative bias applied permanently to the grid, the straight dash line AA' the critical or flash-over potential of the tube, i. e., the negative grid voltage below which the latter will no longer prevent ionization from taking place. If the incoming signals are detected and fed to the grid of the tube, the instantaneous polarization of the grid as a function of the time may have a shape like the graphs 1, 2, 3, or 4 according to the volume or signal strength of the signals. The curves 1, 2, 3, intersect with the straight line AA' at points marked $m$, $n$, $p$, these being the points where ignition of the tube will take place if the plate tension is sufficiently positive at that instant.

The value of the plate current will then depend upon the plate voltage, the characteristics of the output circuit, and the phase relations between the grid voltage and the plate voltage curves.

There are shown two positions of these plate potential curves at I and II. The mean currents are proportional to the areas of the portions of the sinusoids determined by the arcs MO—NO—PO in the first case, and M'O'—N'O'—P'O' in the second. For the very low grid potential represented by the curve 4 the negative bias will always be higher than the critical potential, hence, the tube will not be ignited and the plate current will be strictly of zero value.

If, then, the incoming signals are subject to trouble due to echoes, the envelope, after detection of these signals, will no longer be sinusoidal in form, but may, for instance, have a shape such as shown by the curve I', the signal will be drawn out. The wave-front, however, will not be altered as far as point $r$, $t$, representing the interval of time between the signal and the echo. The values of the output currents of the tube will thus be unaltered seeing that they are practically governed by the beginning of the wave.

The readings of a milliammeter placed in the plate or output circuit of the ionized gas tube could thus serve for the purpose of taking proper and correct bearings by the aid of a null method, for the indications of the same are free from the effects of the echoes. According to the usual method, all that has to be done is to orient the coil antenna so that the signal disappears so as to pass successively through the curves 1, 2, 3, 4. It is easy to note that the method will be so much the more sensitive, the closer the polarization CC' has been chosen to the critical or flash voltage, and the greater the amplitude of the amplified signals, all other things being equal.

Fig. 2 illustrates an assembly view of the outfit according to this invention. The goniometer loop 1 feeds energy to an amplifying receiver 2. As a matter of fact, a standard radiogoniometer assembly may here be used. It is preferably equipped with means to eliminate quadrantal errors. 3 is an audio frequency transformer optionally shunted by a resistance 4. 5 is a potentiometer which, together with the source 6, provides a variable negative polarization. A gas-type valve 7 is arranged to have its cathode connected with the potentiometer and is heated by means of a source not shown in the drawing.

The plate is connected with the resistance 8 intended to limit or regulate the output fed to the indicator device 9 and capacity 10. The time constant of this assembly is regulated to an optimum point in order that the equipment may operate as an indicator of mean values or else of crest values. The output circuit includes a direct current source 14 and the secondary of a transformer 11 by which an alternating plate potential is furnished, preferably under control of an electric tuning fork or other generator 12. The frequency may be varied inside very narrow limits, and may be followed by a phase shifter device 13. Modulation of the transmitter or beacon could advantageously be insured by the aid of an identical tuning fork.

The operation of the outfit is as follows:

The tap of the potentiometer 5 is first set to a value such that the tube 7 will not be ignited, but will be close to the flashing state.

By reading with head-phones the operator adjusts his receiver in a way so as to insure good hearing of the signals. The antenna loop is then set for reception of a favorably strong signal.

After valve 7 has been rendered operative the operator by the aid of the phase shifter 13 or else by acting upon the tuning fork, regulates the current indicated by 9 to a value so that the relations of the phases will be roughly those of Fig. 1. It will have to be noted that the output is a veritable clue or indicator of the phase. Next he adjusts his frame in the customary manner until extinction of the tube is caused. In fact, if there are echoes and if there is still a positive plate potential sufficiently strong at the instant of the echo, it may be that complete extinction of the tube has never been brought about, but merely minimum volume with the correct orientation of the coil antenna, the current suddenly resuming its original value as soon as one moves away from the proper orientation. It may be stated that strictly speaking the device 9 might well be dispensed with for the luminescence of the tube would serve as a sufficient indication. It will be preferable that the tuning forks should generate currents of from 200 to 300 cycles per second and have a stability to within one cycle per hundred thousand. In such case the variations of relative phase during the length of the measurement will be entirely negligible. Moreover, an echo arriving inside 1/2000th of a second is clearly differentiable from the head or front of the wave. It is obvious that these figures are cited merely by way of example.

I claim:

1. In a radiogoniometer system, receiving apparatus comprising a directional loop antenna, a signal translating device connected to said antenna and including a gaseous discharge tube having a predetermined ignition voltage characteristic, means for applying to said tube an anode potential having both alternating and direct current components, means for synchronizing the positive wave crests of said anode potential with the initial portions of the impulses constituting a train of received signals, and means for indicating the effects of the initial portions of said impulses to the exclusion of echo effects due to the reception of reflected signaling waves.

2. A radiogoniometer system comprising transmitting means and receiving means, said transmitting means embodying a device for radiating regularly spaced electrical impulses, and said receiving means comprising a directive aerial for collecting said impulses and their corresponding echoes, amplifying and detecting means connected to said aerial, and indicating means connected to the ouput of the detecting means and comprising a grid controlled ionized gas tube, means for feeding the plate of this tube by an alternating current source the frequency of which corresponds with the periodicity of said impulses and means for so biasing the grid of this tube that a flash-over occurs in said tube when a predetermined impulse amplitude is received and before the echo is received.

3. Receiving apparatus for a radiogoniometer system comprising a directive aerial, amplifying and detective means connected thereto, indicating means including a grid controlled gaseous discharge tube, a local source of low frequency energy in circuit with a direct current source connected between the cathode and anode of said gaseous discharge tube, and means for synchronizing and adjusting the phase relation of currents from said source of low frequency energy in relation to the positive wave fronts of a periodic succession of radiant wave impulses collected by said aerial and impressed on the control grid of said gaseous discharge tube.

4. A radiogoniometer system comprising transmitting and receiving apparatus, means for causing the transmitting apparatus to radiate a plurality of periodic impulses, means including a directive aerial connected to said receiving apparatus for collecting said impulses interspersed with corresponding reflected radiations thereof, amplifying and detecting means fed by the impulses and reflections so collected, a triode gaseous discharge tube having an input circuit connected between its control grid and its cathode, and having an output circuit connected between its anode and cathode, said input circuit being coupled to the output side of said detecting means, an alternating current source coupled to said output circuit and having a frequency substantially equal to the periodicity of said impulses, and means for adjusting the phase of the alternating potentials applied to said output circuit thereby to raise said gaseous discharge tube to its flash-over condition in response to the simultaneous impress upon the input circuit of said tube of a positive wave crest of one of said impulses.

HENRI CHIREIX.